United States Patent
Yoshimura et al.

(12) 
(10) Patent No.: US 6,589,697 B2
(45) Date of Patent: Jul. 8, 2003

(54) RECHARGEABLE LITHIUM BATTERY WITH LI-AL-MN NEGATIVE ELECTRODE AND ELECTROLYTE CONTAINING TRIALKYL PHOSPHITE, PHOSPHATE OR BORATE OR DIALKYL SULFATE OR SULFITE

(75) Inventors: Seiji Yoshimura, Hirakata (JP); Takashi Okamoto, Hirakata (JP); Shin Fujitani, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 168 days.

(21) Appl. No.: 09/804,560

(22) Filed: Mar. 9, 2001

(65) Prior Publication Data

US 2001/0028980 A1 Oct. 11, 2001

(30) Foreign Application Priority Data

Mar. 13, 2000 (JP) ......... 2000-068882

(51) Int. Cl.$^7$ ............... H01M 6/16
(52) U.S. Cl. ......... 429/324; 429/224; 429/321; 429/322
(58) Field of Search .............. 429/224, 321, 429/322, 324

(56) References Cited

U.S. PATENT DOCUMENTS

| 5,569,558 | A | | 10/1996 | Takeuchi et al. |
| 5,578,395 | A | * | 11/1996 | Yoshimura et al. ......... 429/331 |
| 5,804,335 | A | * | 9/1998 | Kamauchi et al. ......... 429/219 |
| 6,004,695 | A | * | 12/1999 | Goda et al. ............... 429/218.1 |

FOREIGN PATENT DOCUMENTS

| JP | 59003871 | 1/1984 |
| JP | 63114064 | 5/1988 |
| JP | 10247517 | 9/1988 |
| JP | 01235158 | 9/1989 |
| JP | 7014610 | 1/1995 |
| JP | 08279366 | 10/1996 |
| JP | 09320634 | 12/1997 |
| JP | 11219711 | 8/1999 |

* cited by examiner

Primary Examiner—Carol Chaney
Assistant Examiner—Dah-Wei D. Yuan
(74) Attorney, Agent, or Firm—W. F. Fasse; W. G. Fasse (57) ABSTRACT

A rechargeable lithium battery includes a lithium-aluminum-manganese alloy negative electrode containing lithium as active material, a positive electrode, and a non-aqueous liquid electrolyte containing a solvent, a solute and at least one additive selected from trialkyl phosphite, trialkyl phosphate, trialkyl borate, dialkyl sulfate and dialkyl sulfite.

18 Claims, 1 Drawing Sheet

RECHARGEABLE LITHIUM BATTERY WITH LI-AL-MN NEGATIVE ELECTRODE AND ELECTROLYTE CONTAINING TRIALKYL PHOSPHITE, PHOSPHATE OR BORATE OR DIALKYL SULFATE OR SULFITE

BACKGROUND OF THE INVENTION

1. Field of the Invention

The present invention relates to a rechargeable lithium battery which includes a lithium-aluminum-manganese alloy negative electrode containing lithium as active material, a positive electrode and a nonaqueous liquid electrolyte.

2. Description of Related Art

It is known that when metallic lithium is used for a negative electrode of a rechargeable lithium battery, the lithium deposited on charge tend to grow into dendrites which eventually hinder repetitive charge-discharge cycling of the battery. This has led to the study to use a lithium-aluminum alloy for a negative electrode of a rechargeable lithium battery. The use of lithium-aluminum alloy appeared to permit repetitive charge-discharge cycling of the battery since it is capable of electrochemical storage and release of lithium and thus unsusceptible to dendrite formation.

The lithium-aluminum alloy, when used for the battery negative electrode, is however subjected to subdivision as a result of repetitive expansion and shrinkage during charge-discharge cycles. This structural destruction results in the failure to obtain satisfactory charge-discharge cycle performance. In order to prevent such subdivision of the lithium-aluminum alloy during charge-discharge cycles, Japanese Patent Laying-Open No. Hei 9-320634 proposes the use of a lithium-aluminum-manganese alloy. This lithium-aluminum-manganese alloy provides a satisfactory charge-discharge cycle performance and has been found feasible as the negative electrode of rechargeable lithium battery.

However, as technology continues to push up performance and reliability levels of equipments, rechargeable lithium batteries using such a lithium-aluminum-manganese alloy for a negative electrode have come to show insufficient charge-discharge cycle performance characteristics, which has been a problem.

SUMMARY OF THE INVENTION

The present invention relates to improvement of such a rechargeable lithium battery including a lithium-aluminum-manganese alloy negative electrode, and its object is to provide a rechargeable lithium battery which exhibits good charge-discharge performance characteristics based on the improved nonaqueous liquid electrolyte.

In order to attain the above-described object, a rechargeable lithium battery in accordance with the present invention includes a lithium-aluminum-manganese negative electrode containing lithium as active material, a positive electrode and a nonaqueous liquid electrolyte containing a solute and a solvent. Characteristically, the nonaqueous liquid electrolyte further contains at lease one additive selected from trialkyl phosphite, trialkyl phosphate, trialkyl borate, dialkyl sulfate and dialkyl sulfite.

In the present invention, the at lease one additive selected from trialkyl phosphite, trialkyl phosphate, trialkyl borate, dialkyl sulfate and dialkyl sulfite may be incorporated in the liquid electrolyte solvent. Such an additive as trialkyl phosphite reacts with the lithium-aluminum-manganese alloy to produce an ionically conductive film on the lithium-aluminum-manganese alloy. This film inhibits the occurrence of a side reaction (decomposition reaction of the liquid electrolyte) between the liquid electrolyte and the lithium-aluminum-manganese alloy during charge-discharge cycles, resulting in obtaining excellent charge-discharge cycle performance characteristics.

In the present invention, the manganese content of the lithium-aluminum-manganese alloy is preferably in the range of 0.1–10 weight %, when given by that of an aluminum-manganese alloy into which lithium is subsequently inserted. If the manganese content falls outside the specified range, the ionically conductive film may not be produced in a satisfactory fashion.

Preferably, the lithium-aluminum-manganese alloy for use in the present invention may be in the form of a lithium-aluminum-manganese-vanadium or lithium-aluminum-manganese-chromium alloy. The use of such alloys permits formation of more effective films and thus results in obtaining particularly good charge-discharge cycle performance characteristics. The vanadium content of the lithium-aluminum-manganese-vanadium alloy is preferably in the range of 0.01–5 weight %, when given by that of an aluminum-manganese-vanadium alloy into which the lithium is subsequently inserted. The chromium content of the lithium-aluminum-manganese-chromium alloy is preferably in the range of 0.01–3 weight %, when given by that of an aluminum-manganese-chromium alloy into which lithium is subsequently inserted.

In the present invention, the additive is preferably incorporated in the amount of 0.1–20%, based on the total volume of the solvent and the additive. If its amount is below 0.1% by volume, the ionically conductive film may not be produced in a satisfactory fashion. On the other hand, if its amount exceeds 20% by volume, the film may be formed excessively thick to hinder the charge-discharge process. Accordingly, particularly good charge-discharge cycle performance characteristics are obtained when the amount by volume of the additive is 0.1–20% of the total volume of the solvent and the additive.

In the present invention, the positive electrode may be composed of any positive electrode material generally known to be useful for rechargeable lithium batteries. Examples of positive electrode materials include manganese dioxide, vanadium pentoxide, niobium oxide, lithium cobalt oxide, lithium nickel oxide, spinel manganese and the like. The improved charge-discharge cycle performance characteristics are obtained when a lithium-manganese complex oxide is used for the positive electrode material. Further improved charge-discharge cycle performance characteristics result when the lithium-manganese complex oxide is a complex oxide of lithium and manganese into which boron or boron compound is incorporated in the form of solid solution.

The lithium-manganese complex oxide containing boron or a boron compound in the form of solid solution is disclosed, for example, in Japanese Patent Laying-Open No. Hei 8-2769366 (1996). Specifically, a ratio of number of boron to manganese atoms (B/Mn) is 0.01–0.20. A mean valence number of manganese is at least 3.80. This complex oxide can be prepared by a method wherein a mixture of a boron, lithium and manganese compound, in a ratio of numbers of atoms (B:Li:Mn) of 0.01–0.20:0.1–2.0:1, is heat treated at a temperature of 150–430° C., preferably of 250–430° C., more preferably of 300–430° C. If the temperature of heat treatment is below 150° C., several problems arise including insufficient progress of reaction and insufficient moisture removal from $MnO_2$. On the other hand, if the heat treatment temperature exceeds 430° C., decomposition of $MnO_2$ may be caused to occur to reduce a mean valence number of manganese to less than 3.80. As a result, the boron-containing lithium-manganese complex oxide during charge undergoes a change in electronic state to become unstable, resulting in the increased tendency to decompose and dissolve in the nonaqueous liquid electrolyte. The heat treatment is preferably performed in the air.

Examples of boron compounds include boron oxide ($B_2O_3$), boric acid ($H_3BO_3$), metaboric acid ($HBO_2$), lithium metaborate ($LiBO_2$) and lithium tetraborate ($Li_2B_4O_7$). Examples of lithium compounds include lithium hydroxide (LiOH), lithium carbonate ($Li_2CO_3$), lithium oxide ($Li_2O$) and lithium nitrate ($LiNO_3$). Examples of manganese compounds include manganese dioxide and manganese oxyhydroxide (MnOOH).

Examples of nonaqueous liquid electrolyte solutes found effective to give good charge-discharge cycle performances include lithium trifluoromethane sulfonimide, lithium pentafluoroethane sulfonimide and lithium trifluoromethane sulfonmethide, which will be later illustrated in the Examples.

Examples of nonaqueous liquid electrolyte solvents found effective to provide good charge-discharge cycle performances are mixed solvents containing at least one organic solvent selected from the group consisting of ethylene carbonate, propylene carbonate, butylene carbonate, vinylene carbonate, γ-butyrolactone and sulfolane, and also containing at least one organic solvent selected from the group consisting of 1,2-dimethoxyethane, 1,2-diethoxyothane, 1,2-ethoxymethoxysthane, tetrahydrofuran, 1,3-dioxolane, dimethyl carbonate, diethyl carbonate and methyl ethyl carbonate. The liquid electrolytes containing such mixed solvents exhibit high ionic conductivity. When such mixed solvents are used in the preparation of the liquid electrolyte, a film having good ionic conductivity is formed on the negative electrode, resulting in the improved charge-discharge cycle performance characteristics.

The present invention utilizes a lithium-aluminum-manganese alloy for the negative electrode and the above-specified additive for incorporation in the liquid electrolyte. This prevents occurrence of a decomposition reaction of the liquid electrolyte on the negative electrode during charge, resulting in obtaining good charge-discharge cycle performance characteristics.

BRIEF DESCRIPTION OF THE DRAWING

The single drawing FIGURE is a schematic sectional view of a flat-disc type rechargeable lithium battery in accordance with one embodiment of the present invention.

DESCRIPTION OF PREFERRED EXAMPLES

Figure 1:
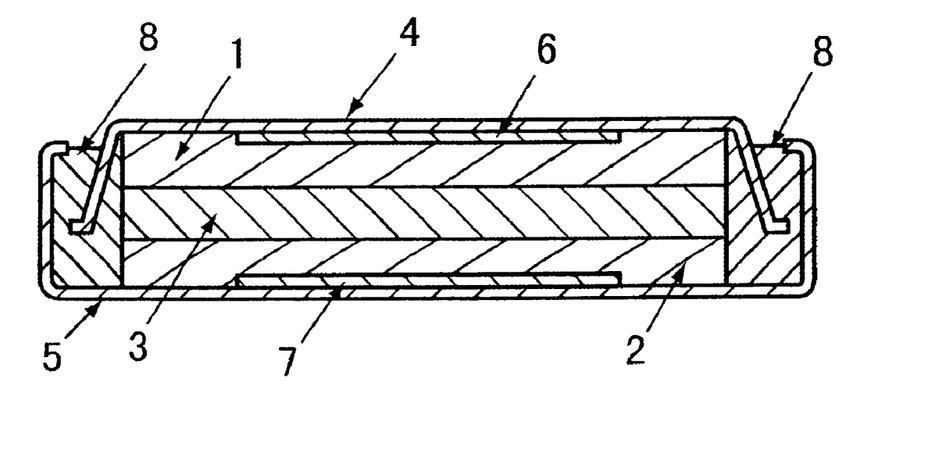

The present invention is now described in more detail with reference to preferred examples. It will be recognized that the following examples merely illustrate the practice of the present invention but are not intended to be limiting thereof. Suitable changes and modifications can be effected without departing from the scope of the present invention.

EXAMPLE 1-1

(A) Positive Electrode Preparation

Lithium hydroxide (LiOH), boron oxide ($B_2O_3$) and manganese dioxide ($MnO_2$) were mixed such that a ratio of numbers of Li, B and Mn atoms (Li:B:Mn) was brought to 0.53:0.06:1.00. The mixture was heat treated (calcined) at 375° C. for a period of 20 hours and then crushed to obtain a boron-containing lithium-manganese complex oxide for use as positive electrode active material. The obtained boron-containing lithium-manganese complex oxide was subjected to X-ray diffraction analysis. Only two peaks, i.e., a peak of $Li_2MnO_3$ and another peak of $MnO_2$ shifted slightly toward a lower angle side from a normal position, were observed in the X-ray diffraction pattern. Also, a mean valence number of manganese in the boron-containing lithium-manganese complex oxide was determined to be 3.80.

The following procedure was utilized to determine a mean valence number of manganese in the boron-containing lithium-manganese complex oxide. First, a sample was allowed to dissolve in hydrochloric acid to prepare a solution. Then, an aqueous solution of ammonium ferrous sulfate was added to the solution. An effective amount of oxygen present in the solution (oxidizing ability of manganese) was determined by a chemical titration method wherein excess ammonium ferrous sulfate was titrated with an aqueous solution of potassium permanganate. An amount of manganese present in the solution was also determined by atomic absorption spectrometry. The mean valence number of manganese in the boron-containing lithium-manganese complex oxide was calculated from the determined effective oxygen amount and manganese amount.

The mean valence number of manganese was found to be smaller than a normal manganese stoichiometry of 4. This is considered due to the entrance of a slight amount of lithium into a solid solution of $MnO_2$, which is considered also responsible for the shifting of the $MnO_2$ peak toward a lower angle side in the X-ray diffraction pattern.

The boron-containing lithium-manganese complex oxide (in the powder form), carbon black (in the powder form) as an electronic conductor and a fluoro resin (in the powder form) as a binder were blended in the weight ratio of 85:10:5 to prepare a cathode mix. This cathode mix was formed in a mold into a circular disc and then dried under reduced pressure at 250° C. for a period of 2 hours to prepare a positive electrode.

(B) Negative Electrode Preparation

Lithium was electrochemically inserted in an aluminum-manganese alloy (Al—Mn alloy) containing 1 weight % of manganese to prepare a lithium-aluminum-manganese alloy (Li—Al—Mn alloy) which was subsequently punched to remove therefrom a circular-disc to prepare a negative electrode.

(C) Nonaqueous Liquid Electrolyte Preparation

Propylene carbonate (PC) and 1,2-dimethoxyethane (DME), as a mixed solvent, and trimethyl phosphite as an additive were blended in the ratio by volume of 47.5:47.5:5 to obtain a mixture. Then, lithium trifluoromethane sulfonimide ($LiN(CF_3SO_2)_2$) as a solute was allowed to dissolve in the mixed solvent to a concentration of 1 mole/liter to prepare a nonaqueous liquid electrolyte.

(D) Battery Assembly

Using the above-prepared positive electrode, negative electrode and nonaqueous liquid electrolyte, a flat-disc type battery A-1 (rechargeable lithium battery sized 24 mm in outer diameter and 3 mm in thickness) according to the present invention was assembled. The separator used was a microporous polypropylene membrane into which the nonaqueous liquid electrolyte was impregnated.

The single drawing FIGURE is a schematic sectional view of the assembled battery A-1 in accordance with the present invention. The illustrated battery A-1 of the present invention includes a negative electrode 1, a positive electrode 2, a separator 3 for separating these electrodes 1 and 2 from each other, a negative can 4, a positive can 5, a negative current collector 6 made of a stainless steel (SUS 304) sheet, a positive current collector 7 made of a stainless steel (SUS 316) sheet and an insulating gasket 8 made of polypropylene. A discharge capacity of 90–100 mAh was reported for all the batteries assembled in the following Examples and Comparative Examples.

The negative and positive electrodes 1 and 2 are located on opposite sides of the separator 3 impregnated with the nonaqueous liquid electrolyte and the assembly is housed in a battery casing defined by the negative and positive cans 4 and 5. The negative current collector 6 connects the negative electrode 1 to the negative can 4. The positive current collector 7 connects the positive electrode 2 to the positive can 5. A chemical energy produced in the battery can be delivered in the form of an electrical energy from terminals connected to the negative and positive cans 4 and 5.

The internal resistance of the battery prior to being subjected to charge-discharge cycle was measured to be about 10Ω. Likewise, the internal resistance of about 10Ω was reported for all the batteries in the following Examples and Comparative Examples.

EXAMPLE 1-2

The procedure of Example 1-1 was followed, except that the additive was changed from trimethyl phosphite to trimethyl phosphate in the preparation of the nonaqueous liquid electrolyte, to assemble a battery A-2 in accordance with the present invention.

EXAMPLE 1-3

The procedure of Example 1-1 was followed, except that the additive was changed from trimethyl phosphite to trimethyl borate in the preparation of the nonaqueous liquid electrolyte, to assemble a battery A-3 in accordance with the present invention.

EXAMPLE 1-4

The procedure of Example 1-1 was followed, except that the additive was changed from trimethyl phosphite to dimethyl sulfate in the preparation of the nonaqueous liquid electrolyte, to assemble a battery A-4 in accordance with the present invention.

EXAMPLE 1-5

The procedure of Example 1-1 was followed, except that the additive was changed from trimethyl phosphite to dimethyl sulfite in the preparation of the nonaqueous liquid electrolyte, to assemble a battery A-5 in accordance with the present invention.

Comparative Example 1-1

The procedure of Example 1-1 was followed, except that the additive was excluded in the preparation of the nonaqueous liquid electrolyte, to assemble a comparative battery X-1.

Charge-Discharge Cycle Test

Each of the batteries A-1–A-5 in accordance with the present invention and the comparative battery X-1 was subjected to repetitive charge-discharge cycling under the conditions of a charge-discharge rate of 10 mA, end-of-charge voltage of 3.2 V and end-of-discharge voltage of 2.0 V to measure the number of cycles during which the discharge capacity dropped to a half of its initial value. The number of cycles as measured is shown in Table 1.

TABLE 1

| Designation of Battery | Solvent (Volume Ratio) | Additive (Volume Ratio) | Solute (1M) | Number of Cycles |
|---|---|---|---|---|
| A1 | PC/DME (47.5/47.5) | Trimethyl Phosphite(5) | $LiN(CF_3SO_2)_2$ | 65 |
| A2 | PC/DME (47.5/47.5) | Trimethyl Phosphate(5) | $LiN(CF_3SO_2)_2$ | 64 |
| A3 | PC/DME (47.5/47.5) | Trimethyl Borate(5) | $LiN(CF_3SO_2)_2$ | 63 |
| A4 | PC/DME (47.5/47.5) | Dimethyl Sulfate(5) | $LiN(CF_3SO_2)_2$ | 61 |
| A5 | PC/DME (47.5/47.5) | Dimethyl Sulfite(5) | $LiN(CF_3SO_2)_2$ | 60 |
| X1 | PC/DME (50/50) | Absent | $LiN(CF_3SO_2)_2$ | 25 |

As can be seen from Table 1, the cycle number of less than 30 was reported for the comparative battery X-1 which excluded the additive (at least one of trialkyl phosphite, trialkyl phosphate, trialkyl borate, dialkyl sulfate and dialkyl sulfite) from the nonaqueous liquid electrolyte. By contrast, the increased cycle numbers were reported for the batteries A-1–A-5 of the present invention incorporating at least one of trialkyl phosphite, trialkyl phosphate, trialkyl borate, dialkyl sulfate and dialkyl sulfite in the nonaqueous liquid electrolyte. The improvement in charge-discharge cycle performance characteristics is considered due to the reaction between the lithium-aluminum-manganese alloy and at least one of trialkyl phosphite, trialkyl phosphate, trialkyl borate, dialkyl sulfate and dialkyl sulfite, which produces on the lithium-aluminum-manganese alloy an ionically conductive film effective to prevent the occurrence of a side reaction between the liquid electrolyte and the lithium-aluminum-manganese alloy during charge-discharge cycles.

EXAMPLE 2-1

In the negative electrode preparation, lithium was electrochemically inserted in an aluminum-manganese alloy (Al—Mn alloy) containing 0.1 weight % of manganese to prepare the lithium-aluminum-manganese alloy (Li—Al—Mn alloy). Otherwise, the procedure of Example 1-1 was followed to assemble a battery B-1 in accordance with the present invention.

EXAMPLE 2-2

In the negative electrode preparation, lithium was electrochemically inserted into an aluminum-manganese alloy (Al—Mn alloy) containing 0.5 weight % of manganese to prepare the lithium-aluminum-manganese alloy (Li—Al—Mn alloy). Otherwise, the precedure of Example 1-1 was followed to assemble a battery B-2 in accordance with the present invention.

EXAMPLE 2-3

In the negative electrode preparation, lithium was electrochemically inserted into an aluminum-manganese alloy (Al—Mn alloy) containing 1 weight % of manganese to prepare the lithium-aluminum-manganese alloy (Li—Al—Mn alloy). That is, the procedure of Example 1-1 was exactly followed to assemble a battery B-3 (identical to the battery A-1) in accordance with the present invention.

EXAMPLE 2-4

In the negative electrode preparation, lithium was electrochemically inserted in an aluminum-manganese alloy (Al—Mn alloy) containing 5 weight % of manganese to prepare the lithium-aluminum-manganese alloy (Li—Al—Mn alloy). Otherwise, the procedure of Example 1-1 was followed to assemble a battery B-4 in accordance with the present invention.

EXAMPLE 2-5

In the negative electrode preparation, lithium was electrochemically inserted in an aluminum-manganese alloy (Al—Mn alloy) containing 10 weight % of manganese to prepare the lithium-aluminum-manganese alloy (Li—Al—Mn alloy). Otherwise, the procedure of Example 1-1 was followed to assemble a battery B-5 in accordance with the present invention.

Charge-Discharge Cycle Test

Each of the batteries B-1–B-5 in accordance with the present invention was subjected to a charge-discharge cycle test under the same conditions as in the preceding test. The results are given in the following Table 2.

TABLE 2

| Designation of Battery | Mn Content (wt %) in Al—Mn Alloy | Number of Cycles |
|---|---|---|
| B1 | 0.1 | 60 |
| B2 | 0.5 | 62 |
| B3 (A1) | 1 | 65 |
| B4 | 5 | 64 |
| B5 | 10 | 62 |

As can be seen from Table 2, good charge-discharge cycle performance characteristics are obtained for the batteries B-1–B-5 of the present invention which include negative electrodes prepared using aluminum-manganese alloys containing 0.1–10 weight % of manganese.

EXAMPLE 3-1

Lithium was electrochemically inserted in an aluminum-manganese-vanadium alloy (Al—Mn—V alloy) containing 1 weight % of manganese and 0.1 weight % of vanadium to prepare a lithium-aluminum-manganese-vanadium alloy (Li—Al—Mn—V alloy) negative electrode. The procedure of Example 1-1 was followed, except that the above prepared negative electrode was used, to assemble a battery C-1 in accordance with the present invention.

EXAMPLE 3-2

Lithium was electrochemically inserted in an aluminum-manganese-chromium alloy (Al—Mn—Cr alloy) containing 1 weight % of manganese and 0.1 weight % of chromium to prepare a lithium-aluminum-manganese-chromium alloy (Li—Al—Mn—Cr alloy) negative electrode. The procedure of Example 1-1 was followed, except that the above prepared negative electrode was used, to assemble a battery C-2 in accordance with the present invention.

Charge-Discharge Cycle Test

Each of the batteries C-1 and C-2 in accordance with the present invention was subjected to a charge-discharge cycle test under the same conditions as in the preceding test. The results are given in the following Table 3.

TABLE 3

| Designation of Battery | Alloy (wt %) | Number of Cycles |
|---|---|---|
| C1 | Al—Mn—V (Al: 98.9, Mn: 1, V: 0.1) | 69 |
| C2 | Al—Mn—Cr (Al: 98.9, Mn: 1, Cr: 0.1) | 67 |
| A1 | Al—Mn (Al: 99, Mn: 1) | 65 |

As can be seen from Table 3, further improved charge-discharge cycle performance characteristics are obtained when the lithium-aluminum-manganese alloy was replaced by the lithium-aluminum-manganese-vanadium or lithium-aluminum-manganese-chromium alloy, which is considered due to the formation of improved films.

EXAMPLE 4-1

Trimethyl phosphite, as the additive, was loaded in the liquid electrolyte solvent in the amount of 0.1% by volume, based on the total volume of the solvent and trimethyl phosphite. Otherwise, the procedure of Example 1-1 was followed to assemble a battery D-1 in accordance with the present invention.

EXAMPLE 4-2

Trimethyl phosphite, as the additive, was loaded in the liquid electrolyte solvent in the amount of 0.5% by volume, based on the total volume of the solvent and trimethyl phosphite. Otherwise, the procedure of Example 1-1 was followed to assemble a battery D-2 in accordance with the present invention.

EXAMPLE 4-3

Trimethyl phosphite, as the additive, was loaded in the liquid electrolyte solvent in the amount of 1% by volume, based on the total volume of the solvent and trimethyl phosphite. Otherwise, the procedure of Example 1-1 was followed to assemble a battery D-3 in accordance with the present invention.

EXAMPLE 4-4

Trimethyl phosphite, as the additive, was loaded in the liquid electrolyte solvent in the amount of 5% by volume, based on the total volume of the solvent and trimethyl phosphite. That is, the procedure of Example 1-1 was exactly followed to assemble a battery D-4 (identical to the battery A-1) in accordance with the present invention.

EXAMPLE 4-5

Trimethyl phosphite, as the additive, was loaded in the liquid electrolyte solvent in the amount of 10% by volume, based on the total volume of the solvent and trimethyl phosphite. Otherwise, the procedure of Example 1-1 was followed to assemble a battery D-5 in accordance with the present invention.

EXAMPLE 4-6

Trimethyl phosphite, as the additive, was loaded in the liquid electrolyte solvent in the amount of 20% by volume, based on the total volume of the solvent and trimethyl phosphite. Otherwise, the procedure of Example 1-1 was followed to assemble a battery D-6 in accordance with the present invention.

Charge-Discharge Cycle Test

Each of the batteries D-1 and D-6 in accordance with the present invention was subjected to a charge-discharge cycle test under the same conditions as in the preceding test. The results are given in the following Table 4.

TABLE 4

| Designation of Battery | Solvent (Volume Ratio) | Additive (Volume Ratio) | Solute (1M) | Number of Cycles |
|---|---|---|---|---|
| D1 | PC/DME (49.95/49.95) | Trimethyl Phosphite(0.1) | $LiN(CF_3SO_2)_2$ | 50 |
| D2 | PC/DME (49.75/49.75) | Trimethyl Phosphite(0.5) | $LiN(CF_3SO_2)_2$ | 55 |
| D3 | PC/DME (49.5/49.5) | Trimethyl Phosphite(1) | $LiN(CF_3SO_2)_2$ | 60 |
| D4 (A1) | PC/DME (47.5/47.5) | Trimethyl Phosphite(5) | $LiN(CF_3SO_2)_2$ | 65 |
| D5 | PC/DME (45/45) | Trimethyl Phosphite(10) | $LiN(CF_3SO_2)_2$ | 62 |
| D6 | PC/DME (40/40) | Trimethyl Phosphite(20) | $LiN(CF_3SO_2)_2$ | 60 |

As can be seen from Table 4, improved charge-discharge cycle performance characteristics are obtained for the batteries D-1 and D-6 of the present invention which include the nonaquous liquid electrolyte containing the specific additive in the amount by volume of 0.1–20%, based on the total volume of the electrolyte solvent and the additive.

EXAMPLE 5-1

Lithium trifluoromethane sulfonimide ($LiN(CF_3SO_2)_2$) was used as the nonaqueous liquid electrolyte solute. That is, the procedure of Example 1-1 was exactly followed to assemble a battery E-1 (identical to the battery A-1)

EXAMPLE 5-2

The procedure of Example 1-1 was followed, except that lithium pentafluoroethane sulfonimide ($LiN(C_2F_5SO_2)_2$) was used as the nonaqueous liquid electrolyte solute, to assemble a battery E-2 in accordance with the present invention.

EXAMPLE 5-3

The procedure of Example 1-1 was followed, except that lithium trifluoromethane sulfonmethide ($LiC(CF_3SO_2)_3$) was used as the nonaqueous liquid electrolyte solute, to assemble a battery E-3 in accordance with the present invention.

EXAMPLE 5-4

The procedure of Example 1-1 was followed, except that lithium trifluoromethanesulfonate ($LiCF_3SO_3$) was used as the nonaqueous liquid electrolyte solute, to assemble a battery E-4 in accordance with the present invention.

EXAMPLE 5-5

The procedure of Example 1-1 was followed, except that lithium hexafluorophosphate ($LiPF_6$) was used as the nonaqueous liquid electrolyte solute, to assemble a battery E-5 in accordance with the present invention.

EXAMPLE 5-6

The procedure of Example 1-1 was followed, except that lithium tetrafluoroborate ($LiBF_4$) was used as the nonaqueous liquid electrolyte solute, to assemble a battery E-6 in accordance with the present invention.

EXAMPLE 5-7

The procedure of Example 1-1 was followed, except that lithium hexafluoroarsenate ($LiAsF_6$) was used as the nonaqueous liquid electrolyte solute, to assemble a battery E-7 in accordance with the present invention.

EXAMPLE 5-8

The procedure of Example 1-1 was followed, except that lithium perchlorate ($LiClO_4$) was used as the nonaqueous liquid electrolyte solute, to assemble a battery E-8 in accordance with the present invention.

Charge-Discharge Cycle Test

Each of the batteries E-1–E-8 in accordance with the present invention was subjected to a charge-discharge cycle test under the same conditions as in the preceding test. The results are given in the following Table 5.

TABLE 5

| Designation of Battery | Solvent (Volume Ratio) | Additive (Volume Ratio) | Solute (1M) | Number of Cycles |
|---|---|---|---|---|
| E1 (A1) | PC/DME (47.5/47.5) | Trimethyl Phosphite(5) | $LiN(CF_3SO_2)_2$ | 50 |
| E2 | PC/DME (47.5/47.5) | Trimethyl Phosphite(5) | $LiN(C_2F_5SO_2)_2$ | 64 |
| E3 | PC/DME (47.5/47.5) | Trimethyl Phosphite(5) | $LiC(CF_3SO_2)_3$ | 63 |
| E4 | PC/DME (47.5/47.5) | Trimethyl Phosphite(5) | $LiCF_3SO_3$ | 56 |
| E5 | PC/DME (47.5/47.5) | Trimethyl Phosphite(5) | $LiPF_6$ | 52 |
| E6 | PC/DME (47.5/47.5) | Trimethyl Phosphite(5) | $LiBF_4$ | 54 |
| E7 | PC/DME (47.5/47.5) | Trimethyl Phosphite(5) | $LiAsF_6$ | 53 |
| E8 | PC/DME (47.5/47.5) | Trimethyl Phosphite(5) | $LiClO_4$ | 44 |

As can be seen from Table 5, the cycle frequencies of less than 60 were reported for the batteries E-4–E-8 using $LiCF_3SO_3$, $LiPF_6$, $LiBF_4$, $LiAsF_6$ and $LiClO_4$ for their respective liquid electrolyte solutes. By contrast, the increased cycle frequencies were reported for the batteries E-1–E-3 using $LiN(CF_3SO_2)_2$, $LiN(C_2F_5SO_2)_2$ and $LiC(CF_3SO_2)_3$ for their respective liquid electrolyte solutes. This effect of improving charge-discharge cycle performance characteristics is found to become significant particularly when $LiN(CF_3SO_2)_2$ is used for the liquid electrolyte solute.

EXAMPLE 6-1

Ethylene carbonate (EC) and 1,2-dimethoxyethane (DME) were blended in the ratio by volume of 47.5:47.5 to prepare a mixed solvent for inclusion in the nonaqueous liquid electrolyte. Otherwise, the procedure of Example 1-1 was followed to assemble a battery F-1 in accordance with the present invention.

EXAMPLE 6-2

Butylene carbonate (BC) and 1,2-dimethoxyethane (DME) were blended in the ratio by volume of 47.5:47.5 to prepare a mixed solvent for inclusion in the nonaqueous liquid electrolyte. Otherwise, the procedure of Example 1-1 was followed to assemble a battery F-2 in accordance with the present invention.

EXAMPLE 6-3

Vinylene carbonate (VC) and 1,2-dimethoxyethane (DME) were blended in the ratio by volume of 47.5:47.5 to prepare a mixed solvent for inclusion in the nonaqueous liquid electrolyte. Otherwise, the procedure of Example 1-1 was followed to assemble a battery F-3 in accordance with the present invention.

EXAMPLE 6-4

γ-butyrolactone (γ-BL) and 1,2-dimethoxyethane (DME) were blended in the ratio by volume of 47.5:47.5 to prepare a mixed solvent for inclusion in the nonaqueous liquid electrolyte. Otherwise, the procedure of Example 1-1 was followed to assemble a battery F-4 in accordance with the present invention.

EXAMPLE 6-5

Sulfolane (SL) and 1,2-dimethoxyethane (DME) were blended in the ratio by volume of 47.5:47.5 to prepare a mixed solvent for inclusion in the nonaqueous liquid electrolyte. Otherwise, the procedure of Example 1-1 was followed to assemble a battery F-5 in accordance with the present invention.

EXAMPLE 6-6

Propylene carbonate (PC) and 1,2-diethoxyethane (DEE) were blended in the ratio by volume of 47.5:47.5 to prepare a mixed solvent for inclusion in the nonaqueous liquid electrolyte. Otherwise, the procedure of Example 1-1 was followed to assemble a battery F-6 in accordance with the present invention.

EXAMPLE 6-7

Propylene carbonate (PC) and 1,2-ethoxymethoxyethane (EME) were blended in the ratio by volume of 47.5:47.5 to prepare a mixed solvent for inclusion in the nonaqueous liquid electrolyte. Otherwise, the procedure of Example 1-1 was followed to assemble a battery F-7 in accordance with the present invention.

EXAMPLE 6-8

Propylene carbonate (PC) and tetrahydrofuran (THF) were blended in the ratio by volume of 47.5:47.5 to prepare a mixed solvent for inclusion in the nonaqueous liquid electrolyte. Otherwise, the procedure of Example 1-1 was followed to assemble a battery F-8 in accordance with the present invention.

EXAMPLE 6-9

Propylene carbonate (PC) and 1,3-dioxolane (DOXL) were blended in the ratio by volume of 47.5:47.5 to prepare a mixed solvent for inclusion in the nonaqueous liquid electrolyte. Otherwise, the procedure of Example 1-1 was followed to assemble a battery F-9 in accordance with the present invention.

EXAMPLE 6-10

Propylene carbonate (PC) and dimethyl carbonate (DMC) were blended in the ratio by volume of 47.5:47.5 to prepare a mixed solvent for inclusion in the nonaqueous liquid electrolyte. Otherwise, the procedure of Example 1-1 was followed to assemble a battery F-10 in accordance with the present invention.

EXAMPLE 6-11

Propylene carbonate (PC) and diethyl carbonate (DEC) were blended in the ratio by volume of 47.5:47.5 to prepare a mixed solvent for inclusion in the nonaqueous liquid electrolyte. Otherwise, the procedure of Example 1-1 was followed to assemble a battery F-11 in accordance with the present invention.

EXAMPLE 6-12

Propylene carbonate (PC) and ethyl methyl carbonate (EMC) were blended in the ratio by volume of 47.5:47.5 to prepare a mixed solvent for inclusion in the nonaqueous liquid electrolyte. Otherwise, the procedure of Example 1-1 was followed to assemble a battery F-12 in accordance with the present invention.

EXAMPLE 6-13

Propylene carbonate (PC) was used as a sole solvent for inclusion in the nonaqueous liquid electrolyte. Otherwise, the procedure of Example 1-1 was followed to assemble a battery F-13 in accordance with the present invention.

EXAMPLE 6-14

Ethylene carbonate (EC) was used as a sole solvent for inclusion in the nonaqueous liquid electrolyte. Otherwise, the procedure of Example 1-1 was followed to assemble a battery F-14 in accordance with the present invention.

EXAMPLE 6-15

Butylene carbonate (BC) was used as a sole solvent for inclusion in the nonaqueous liquid electrolyte. Otherwise, the procedure of Example 1-1 was followed to assemble a battery F-15 in accordance with the present invention.

Vinylene carbonate (VC) was used as a sole solvent for inclusion in the nonaqueous liquid electrolyte. Otherwise, the procedure of Example 1-1 was followed to assemble a battery F-16 in accordance with the present invention.

EXAMPLE 6-17

γ-butyrolactone (γ-BL) was used as a sole solvent for inclusion in the nonaqueous liquid electrolyte. Otherwise, the procedure of Example 1-1 was followed to assemble a battery F-17 in accordance with the present invention.

EXAMPLE 6-18

Sulfolane (SL) was used as a sole solvent for inclusion in the nonaqueous liquid electrolyte. Otherwise, the procedure of Example 1-1 was followed to assemble a battery F-18 in accordance with the present invention.

EXAMPLE 6-19

1,2-dimethoxyethane (DME) was used as a sole solvent for inclusion in the nonaqueous liquid electrolyte. Otherwise, the procedure of Example 1-1 was followed to assemble a battery F-19 in accordance with the present invention.

EXAMPLE 6-20

1,2-diethoxyethane (DEE) was used as a sole solvent for inclusion in the nonaqueous liquid electrolyte. Otherwise, the procedure of Example 1-1 was followed to assemble a battery F-20 in accordance with the present invention.

EXAMPLE 6-21

1,2-ethoxymethoxyethane (EME) was used as a sole solvent for inclusion in the nonaqueous liquid electrolyte.

Otherwise, the procedure of Example 1-1 was followed to assemble a battery F-21 in accordance with the present invention.

EXAMPLE 6-22

Tetrahydrofuran (THF) was used as a sole solvent for inclusion in the nonaqueous liquid electrolyte. Otherwise, the procedure of Example 1-1 was followed to assemble a battery F-22 in accordance with the present invention.

EXAMPLE 6-23

1,3-dioxolane (DOXL) was used as a sole solvent for inclusion in the nonaqueous liquid electrolyte. Otherwise, the procedure of Example 1-1 was followed to assemble a battery F-23 in accordance with the present invention.

EXAMPLE 6-24

Dimethyl carbonate (DMC) was used as a sole solvent for inclusion in the nonaqueous liquid electrolyte. Otherwise, the procedure of Example 1-1 was followed to assemble a battery F-24 in accordance with the present invention.

EXAMPLE 6-25

Diethyl carbonate (DEC) was used as a sole solvent for inclusion in the nonaqueous liquid electrolyte. Otherwise, the procedure of Example 1-1 was followed to assemble a battery F-25 in accordance with the present invention.

EXAMPLE 6-26

Ethyl methyl carbonate (EMC) was used as a sole solvent for inclusion in the nonaqueous liquid electrolyte. Otherwise, the procedure of Example 1-1 was followed to assemble a battery F-26 in accordance with the present invention.

Charge-Discharge Cycle Test

Each of the batteries A-1 and E-1–E-26 in accordance with the present invention was subjected to a charge-discharge cycle test under the same conditions as in the preceding test. The results are given in the following Table 6.

TABLE 6

| Designation of Battery | Solvent (Volume Ratio) | Additive (Volume Ratio) | Solute (1M) | Number of Cycles |
|---|---|---|---|---|
| A1 | PC/DME (47.5/47.5) | Trimethyl Phosphite(5) | $LiN(CF_3SO_2)_2$ | 65 |
| F1 | EC/DME (47.5/47.5) | Trimethyl Phosphite(5) | $LiN(CF_3SO_2)_2$ | 66 |
| F2 | BC/DME (47.5/47.5) | Trimethyl Phosphite(5) | $LiN(CF_3SO_2)_2$ | 63 |
| F3 | VC/DME (47.5/47.5) | Trimethyl Phosphite(5) | $LiN(CF_3SO_2)_2$ | 55 |
| F4 | γ-BL/DME (47.5/47.5) | Trimethyl Phosphite(5) | $LiN(CF_3SO_2)_2$ | 55 |
| F5 | SL/DME (47.5/47.5) | Trimethyl Phosphite(5) | $LiN(CF_3SO_2)_2$ | 57 |
| F6 | PC/DEE (47.5/47.5) | Trimethyl Phosphite(5) | $LiN(CF_3SO_2)_2$ | 58 |
| F7 | PC/EME (47.5/47.5) | Trimethyl Phosphite(5) | $LiN(CF_3SO_2)_2$ | 54 |
| F8 | PC/THF (47.5/47.5) | Trimethyl Phosphite(5) | $LiN(CF_3SO_2)_2$ | 52 |
| F9 | PC/DOXL (47.5/47.5) | Trimethyl Phosphite(5) | $LiN(CF_3SO_2)_2$ | 53 |
| F10 | PC/DMC (47.5/47.5) | Trimethyl Phosphite(5) | $LiN(CF_3SO_2)_2$ | 51 |
| F11 | PC/DEC (47.5/47.5) | Trimethyl Phosphite(5) | $LiN(CF_3SO_2)_2$ | 51 |
| F12 | PC/EMC (47.5/47.5) | Trimethyl Phosphite(5) | $LiN(CF_3SO_2)_2$ | 50 |
| F13 | PC(95) | Trimethyl Phosphite(5) | $LiN(CF_3SO_2)_2$ | 46 |
| F14 | EC(95) | Trimethyl Phosphite(5) | $LiN(CF_3SO_2)_2$ | 49 |
| F15 | BC(95) | Trimethyl Phosphite(5) | $LiN(CF_3SO_2)_2$ | 44 |
| F16 | VC(95) | Trimethyl Phosphite(5) | $LiN(CF_3SO_2)_2$ | 45 |
| F17 | γ-BL(95) | Trimethyl Phosphite(5) | $LiN(CF_3SO_2)_2$ | 43 |
| F18 | SL(95) | Trimethyl Phosphite(5) | $LiN(CF_3SO_2)_2$ | 44 |
| F19 | DME(95) | Trimethyl Phosphite(5) | $LiN(CF_3SO_2)_2$ | 41 |
| F20 | DEE(95) | Trimethyl Phosphite(5) | $LiN(CF_3SO_2)_2$ | 45 |
| F21 | EME(95) | Trimethyl Phosphite(5) | $LiN(CF_3SO_2)_2$ | 47 |
| F22 | THF(95) | Trimethyl Phosphite(5) | $LiN(CF_3SO_2)_2$ | 46 |
| F23 | DOXL(95) | Trimethyl Phosphite(5) | $LiN(CF_3SO_2)_2$ | 47 |
| F24 | DMC(95) | Trimethyl Phosphite(5) | $LiN(CF_3SO_2)_2$ | 41 |
| F25 | DEC(95) | Trimethyl Phosphite(5) | $LiN(CF_3SO_2)_2$ | 48 |
| F26 | EMC(95) | Trimethyl Phosphite(5) | $LiN(CF_3SO_2)_2$ | 41 |

As can be seen from Table 6, cycle frequencies of less than 50 were reported for the batteries F-13–F-26 using sole solvents for incorporation in their respective nonaqueous liquid electrolytes. By contrast, particularly good charge-discharge cycle performance characteristics were reported for the batteries A-1 and F-1–F-12 using any of mixed solvents containing at least one organic solvent selected from the group consisting of ethylene carbonate, propylene carbonate, butylene carbonate, vinylene carbonate, γ-butyrolactone and sulfolane, and also at least one organic solvent selected from the group consisting of 1,2-dimethoxyethane, 1,2-diethoxyethane, 1,2-ethoxymethoxyethane, tetrahydrofuran, 1,3-dioxolane, dimethyl carbonate, diethyl carbonate and methyl ethyl carbonate for inclusion in their respective nonaqueous liquid electrolytes.

In accordance with the present invention, rechargeable lithium batteries can be provided which exhibit good charge-discharge cycle performance characteristics with extremely high reliability.

What is claimed is:

1. A rechargeable lithium battery including:
    a negative electrode comprising a lithium-aluminum-manganese-vanadium or lithium-aluminum-manganese-chromium alloy containing lithium as active material;
    a positive electrode; and
    a nonaqueous liquid electrolyte containing a solvent, a solute and at least one additive selected from trialkyl phosphite, trialkyl phosphate, trialkyl borate, dialkyl sulfate and dialkyl sulfite.

2. The rechargeable lithium battery of claim 1, wherein the manganese content of said alloy is in the range of 0.1–10 weight %, when given by that of an aluminum-manganese alloy into which the lithium is subsequently added.

3. The rechargeable lithium battery of claim 1, wherein said additive is contained in said solvent in the amount by volume of 0.1–20%, based on the total volume of the solvent and additive.

4. The rechargeable lithium battery of claim 1, wherein said solute is lithium trifluoromethane sulfonimide, lithium pentafluoroethane sulfonimide or lithium trifluoromethane sulfonmethide.

5. The rechargeable lithium battery of claim 1, wherein said solvent is a mixed solvent containing at least one organic solvent selected from the group consisting of ethylene carbonate, propylene carbonate, butylene carbonate, vinylene carbonate, γ-butyrolactone and sulfolane, and also containing at least one organic solvent selected from the group consisting of 1,2-dimethoxyethane, 1,2-diethoxyethane, 1,2-ethoxymethoxyethane, tetrahydrofuran, 1,3-dioxolane, dimethyl carbonate, diethyl carbonate and methyl ethyl carbonate.

6. The rechargeable lithium battery of claim 1, wherein said positive electrode contains a lithium-manganese complex oxide.

7. The rechargeable lithium battery of claim 6, wherein said lithium-manganese complex oxide is a complex oxide of lithium and manganese that incorporates, in the form of solid solution, boron or a boron compound.

8. The rechargeable lithium battery of claim 1, wherein said alloy is said lithium-aluminum-manganese-vanadium alloy.

9. The rechargeable lithium battery of claim 1, wherein said alloy is said lithium-aluminum-manganese-chromium alloy.

10. A rechargeable lithium battery including:
   a negative electrode comprising a lithium-aluminum-manganese alloy containing lithium as active material;
   a positive electrode; and
   a nonaqueous liquid electrolyte containing a solvent, a solute and at least one additive selected from trialkyl phosphite, trialkyl phosphate, trialkyl borate, and dialkyl sulfate.

11. The rechargeable lithium battery of claim 10, wherein the manganese content of said lithium-aluminum-manganese alloy is in the range of 0.1–10 weight %, when given by that of an aluminum-manganese alloy into which the lithium is subsequently added.

12. The rechargeable lithium battery of claim 10, wherein said lithium-aluminum-manganese alloy is a lithium-aluminum-manganese-vanadium or lithium-aluminum-manganese-chromium alloy.

13. The rechargeable lithium battery of claim 10, wherein said additive is contained in said solvent in the amount by volume of 0.1–20%, based on the total volume of the solvent and additive.

14. The rechargeable lithium battery of claim 10, wherein said solute is lithium trifluoromethane sulfonimide, lithium pentafluoroethane sulfonimide or lithium trifluoromethane sulfonmethide.

15. The rechargeable lithium battery of claim 10, wherein said solvent is a mixed solvent containing at least one organic solvent selected from the group consisting of ethylene carbonate, propylene carbonate, butylene carbonate, vinylene carbonate, γ-butyrolactone and sulfolane, and also containing at least one organic solvent selected from the group consisting of 1,2-dimethoxyethane, 1,2-diethoxyethane, 1,2-ethoxymethoxyethane, tetrahydrofuran, 1,3-dioxolane, dimethyl carbonate, diethyl carbonate and methyl ethyl carbonate.

16. The rechargeable lithium battery of claim 10, wherein said positive electrode contains a lithium-manganese complex oxide.

17. The rechargeable lithium battery of claim 16, wherein said lithium-manganese complex oxide is a complex oxide of lithium and manganese that incorporates, in the form of solid solution, boron or a boron compound.

18. The rechargeable lithium battery of claim 10, wherein said alloy consists of lithium, aluminum, and manganese.

* * * * *

UNITED STATES PATENT AND TRADEMARK OFFICE
CERTIFICATE OF CORRECTION

PATENT NO. : 6,589,697 B2
DATED : July 8, 2003
INVENTOR(S) : Yoshimura et al.

It is certified that error appears in the above-identified patent and that said Letters Patent is hereby corrected as shown below:

Column 10,
Table 5, column 5, line 1, replace "50" by -- 65 --.

Signed and Sealed this

Fourth Day of November, 2003

JAMES E. ROGAN
*Director of the United States Patent and Trademark Office*